US011972142B2

United States Patent
Thomas (10) Patent No.: US 11,972,142 B2
(45) Date of Patent: Apr. 30, 2024

(54) DATA PROCESSING CIRCUITRY AND APPARATUS FOR PACKET-BASED DATA COMMUNICATIONS

(71) Applicant: Arm Limited, Cambridge (GB)

(72) Inventor: Tessil Thomas, Cambridge (GB)

(73) Assignee: ARM LIMITED, Cambridge (GB)

(*) Notice: Subject to any disclaimer, the term of this patent is extended or adjusted under 35 U.S.C. 154(b) by 45 days.

(21) Appl. No.: 17/136,510

(22) Filed: Dec. 29, 2020

(65) Prior Publication Data
US 2022/0206709 A1 Jun. 30, 2022

(51) Int. Cl.
*G06F 3/06* (2006.01)
*G06F 12/0804* (2016.01)

(52) U.S. Cl.
CPC .......... *G06F 3/0659* (2013.01); *G06F 3/0604* (2013.01); *G06F 3/0679* (2013.01); *G06F 12/0804* (2013.01); *G06F 2212/1032* (2013.01)

(58) Field of Classification Search
CPC .... G06F 3/0604; G06F 3/0659; G06F 3/0679; G06F 12/0804; G06F 2212/1032
See application file for complete search history.

(56) References Cited

U.S. PATENT DOCUMENTS

| | | | | |
|---|---|---|---|---|
| 2005/0270109 | A1* | 12/2005 | Ha | G06F 1/32 331/57 |
| 2014/0006701 | A1* | 1/2014 | Condit | G06F 12/0804 711/105 |
| 2014/0068183 | A1* | 3/2014 | Joshi | G06F 3/0659 711/114 |
| 2014/0359266 | A1* | 12/2014 | Madhusudana | G06F 1/24 713/2 |
| 2017/0255559 | A1* | 9/2017 | Burstein | G06F 15/17331 |
| 2021/0049101 | A1* | 2/2021 | Ray | G06F 3/0679 |

* cited by examiner

*Primary Examiner* — Larry T Mackall
(74) *Attorney, Agent, or Firm* — Nixon & Vanderhye, PC (57) ABSTRACT

Circuitry comprises packet reception circuitry to receive a data communication packet with a storage classification from sending circuitry, the data communication packet including at least payload data and a target address for storage of the payload data; and storage control circuitry to control writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

18 Claims, 7 Drawing Sheets

DATA PROCESSING CIRCUITRY AND APPARATUS FOR PACKET-BASED DATA COMMUNICATIONS

BACKGROUND

This disclosure relates to circuitry and apparatus.

In previously proposed packet based data communication arrangements between (for example) a first (sender, requester) circuitry and a second (recipient, target) circuitry, the second circuitry is able to select a storage type to store the data payload.

In transmitting a data packet from the first circuitry to the second circuitry, the data packet may have to travel through buffers, caches, interconnects or the like which are non-persistent. The first circuitry may have no knowledge of whether a data payload has reached a persistent storage domain within the overall apparatus.

Furthermore, the second circuitry will (for its own prevailing reasons) store a data payload in a destination or storage type.

The present disclosure addresses potential issues relating to this type of arrangement.

SUMMARY

In an example arrangement there is provided circuitry comprising:

packet reception circuitry to receive a data communication packet with a storage classification from sending circuitry, the data communication packet including at least payload data and a target address for storage of the payload data; and storage control circuitry to control writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

In another example arrangement there is provided circuitry comprising:

generator circuitry to generate a data communication packet comprising at least payload data and a target address for storage, by recipient circuitry, of the payload data;

control circuitry to determine a storage classification for the payload data of a given data communication packet, the storage classification indicating a degree of persistence to be applied to that payload data by the recipient circuitry; and packet transmission circuitry to transmit the given data communication packet with the storage classification to the recipient circuitry.

In another example arrangement there is provided data processing apparatus comprising:

first data processing circuitry;
second data processing circuitry;
interconnect circuitry to provide a data connection at least for the transmission of data communication packets between the first data processing circuitry and the second data processing circuitry; and data storage circuitry comprising a set of two or more candidate storage devices associated with one or both of the first data processing circuitry and the second data processing circuitry, each of the set of two or more candidate storage devices being addressable by a target address;

in which at least one of the first data processing circuitry and the second data processing circuitry is configured to operate as sending circuitry comprising generator circuitry to generate a data communication packet comprising at least payload data and the target address for storage, by another of the first data processing circuitry and the second data processing circuitry acting as recipient circuitry, of the payload data; control circuitry to determine a storage classification for the payload data of a given data communication packet, the storage classification indicating a degree of persistence to be applied to that payload data by the recipient circuitry; and packet transmission circuitry to transmit the given data communication packet with the storage classification to the recipient circuitry;

and in which at least one of the first data processing circuitry and the second data processing circuitry is configured to operate as recipient circuitry comprising packet reception circuitry to receive the data communication packet with the storage classification from another of the first data processing circuitry and the second data processing circuitry acting as sending circuitry; and storage control circuitry to control writing of the payload data of a given data communication packet by one or more storage devices selected from the set of two or more candidate storage devices, the storage control circuitry being responsive to the storage classification received with the given data communication packet and to respective persistence properties associated with the set of two or more candidate storage devices.

In an example arrangement there is provided a method comprising:

receiving, at recipient circuitry, a data communication packet with a storage classification from sending circuitry, the data communication packet including at least payload data and a target address for storage of the payload data; and controlling writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

In an example arrangement there is provided a method comprising:

generating, at sending circuitry, a data communication packet comprising at least payload data and a target address for storage, by recipient circuitry, of the payload data;

determining a storage classification for the payload data of a given data communication packet, the storage classification indicating a degree of persistence to be applied to that payload data by the recipient circuitry; and transmitting the given data communication packet with the storage classification to recipient circuitry.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides circuitry comprising:

packet reception circuitry to receive a data communication packet with a storage classification from sending circuitry, the data communication packet including at least payload data and a target address for storage of the payload data; and storage control circuitry to control writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

The present disclosure recognises and addresses the issue that circuitry receiving a packet may (for its own prevailing reasons) store a data payload in a destination independently of any future requirements applicable to that data payload. However, the packet sending circuitry may be aware of such future requirements. Example arrangements therefore provide the facility for the packet sending circuitry to provide a data placement indication to the packet receiving circuitry as to a type of storage (for example, persistent or non-persistent) for use in connection with that data payload. The recipient circuitry may be arranged to follow the indication provided by the first circuitry.

The indication may be provided as metadata or one or more attributes within or associated with the given data packet. In examples, the packet reception circuitry is configured to detect the storage classification as a predetermined data field of the data communication packet.

In example arrangements, the set of two or more candidate storage devices comprises:

at least one persistent storage device, a persistent storage device being a non-volatile storage device to store data in response to a data handling process such that the data can be accessed after termination of the data handling process; and at least one non-persistent storage device, such as (for example) a cache memory.

In examples, particularly where at least two persistent storage devices and/or at least two non-persistent storage devices are provided, the circuitry may be configured to provide configuration data indicating a number of persistent storage devices and//or a number of non-persistent storage devices to the sending circuitry.

In response to the indication, the storage control circuitry may be configured:

when the storage classification indicates a non-persistent classification and when the set of two or more candidate storage devices comprises at least one non-persistent storage device, to write the payload data to the at least one non-persistent storage device; and when the storage classification indicates a persistent classification and when the set of two or more candidate storage devices comprises at least one persistent storage device, to write the payload data to the at least one persistent storage device.

In other examples, the storage control circuitry is configured, when the storage classification indicates a dual classification and when the set of two or more candidate storage devices comprises at least one non-persistent storage device and at least one persistent storage device, to write the payload data to the at least one non-persistent storage device and to the at least one persistent storage device.

A further option is the use of a flush command, in which the storage control circuitry is configured, in response to such a flush command received from the sending circuitry in respect of the target address, to execute the flush command by writing data at the target address from the at least one non-persistent storage device to the at least one persistent storage device.

In order to allow the use of a flush command to provide a guarantee to the sending device that the relevant data is safely in persistent memory, the (recipient) circuitry may be configured to send an acknowledgement to the sending circuitry in response to execution of the flush command.

Another example embodiment provides circuitry comprising:

generator circuitry to generate a data communication packet comprising at least payload data and a target address for storage, by recipient circuitry, of the payload data;

control circuitry to determine a storage classification for the payload data of a given data communication packet, the storage classification indicating a degree of persistence to be applied to that payload data by the recipient circuitry; and packet transmission circuitry to transmit the given data communication packet with the storage classification to the recipient circuitry.

In example arrangements, although the storage classification could be sent by a side channel or another path, the generator circuitry is configured to represent the storage classification by a predetermined data field of the data communication packet.

In example arrangements the control circuitry is configured:

to determine the storage classification to be a non-persistent classification, indicating a request to the recipient circuitry to write the payload data to at least one non-persistent storage device; or to determine the storage classification to be a persistent classification, indicating a request to the recipient circuitry to write the payload data to at least one persistent storage device.

In examples, the storage control circuitry is configured to determine the storage classification to be a dual classification, indicating a request to the recipient circuitry to write the payload data to at least one non-persistent storage device and to at least one persistent storage device.

In order to make use of a flush command as discussed above, the control circuitry may be configured to generate a flush command to the sending circuitry in respect of the target address, to request the recipient circuitry to write data at the target address from at least one non-persistent storage device to at least one persistent storage device.

In example embodiments the circuitry comprises data processing circuitry configured, in response to execution of processing instructions by the data processing circuitry, to provide the payload data to the generator circuitry and to provide an indication of a required storage classification to the control circuitry.

In examples, such as examples in which the control circuitry is configured to select a classification between at least two persistent storage devices and/or at least two non-persistent storage devices at the recipient circuitry, the circuitry may be responsive to configuration data indicating a number of persistent storage devices and//or a number of non-persistent storage devices at the recipient circuitry.

Another example embodiment provides data processing apparatus comprising:

first data processing circuitry;
second data processing circuitry;
interconnect circuitry to provide a data connection at least for the transmission of data communication packets between the first data processing circuitry and the second data processing circuitry; and
data storage circuitry comprising a set of two or more candidate storage devices associated with one or both of the first data processing circuitry and the second data processing circuitry, each of the set of two or more candidate storage devices being addressable by a target address;
in which at least one of the first data processing circuitry and the second data processing circuitry is configured to operate as sending circuitry comprising generator circuitry to generate a data communication packet comprising at least payload data and the target address for storage, by another of the first data processing circuitry and the second data processing circuitry acting as recipient circuitry, of the payload data; control circuitry to determine a storage classification for the payload data of a given data communication packet, the storage classification indicating a degree of persistence to be applied to that payload data by the recipient circuitry; and packet transmission circuitry to transmit the given data communication packet with the storage classification to the recipient circuitry;

and in which at least one of the first data processing circuitry and the second data processing circuitry is configured to operate as recipient circuitry comprising packet reception circuitry to receive the data communication packet with the storage classification from another of the first data processing circuitry and the second data processing circuitry acting as sending circuitry; and storage control circuitry to control writing of the payload data of a given data communication packet by one or more storage devices selected from the set of two or more candidate storage devices, the storage control circuitry being responsive to the storage classification received with the given data communication packet and to respective persistence properties associated with the set of two or more candidate storage devices.

The apparatus may be implemented, by way of example, as multiple discrete circuitries or in an arrangement of a single integrated circuit substrate by which at least the first data processing circuitry and the second data processing circuitry are implemented.

Another example embodiment provides a method comprising:

receiving, at recipient circuitry, a data communication packet with a storage classification from sending circuitry, the data communication packet including at least payload data and a target address for storage of the payload data; and
controlling writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

Another example embodiment provides a method comprising:

generating, at sending circuitry, a data communication packet comprising at least payload data and a target address for storage, by recipient circuitry, of the payload data;
determining a storage classification for the payload data of a given data communication packet, the storage classification indicating a degree of persistence to be applied to that payload data by the recipient circuitry; and
transmitting the given data communication packet with the storage classification to recipient circuitry.

Overview of Apparatus

Figure 1:
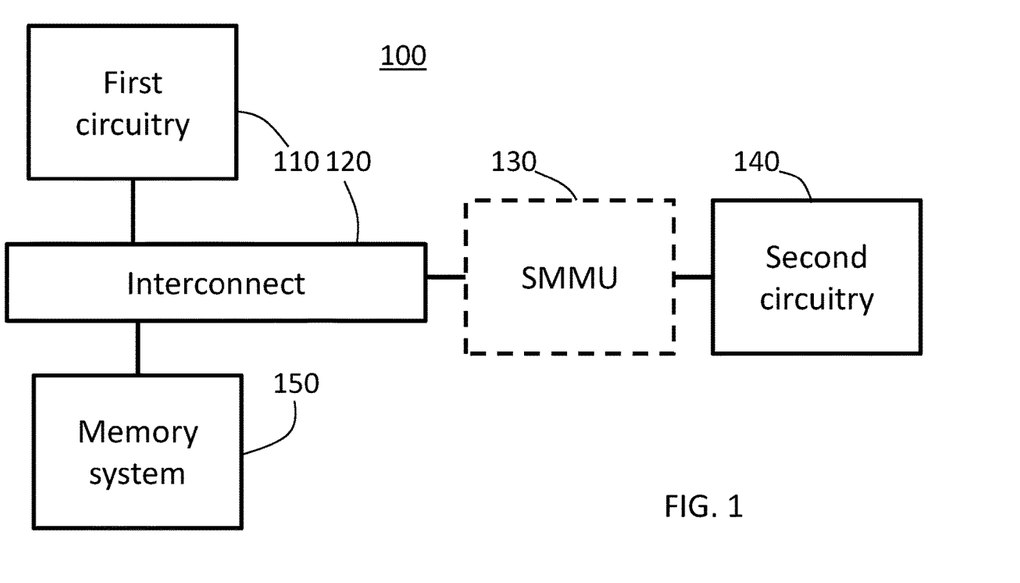
FIG. 1 schematically illustrates an example of a data processing apparatus.

Referring now to the drawings, FIG. 1 schematically illustrates apparatus 100, which in this example may operate according to a so-called Peripheral Component Interconnect Express (PCIe) protocol.

The apparatus 100 comprises first (sending) circuitry 110, interconnect circuitry 120, optionally a system memory management unit (SMMU) 130 (if address translation is indeed required at this point in the apparatus) and second (recipient) circuitry 140.

The discussion below relates to aspects of the generation, transmission and subsequent handling of a data packet sent from the first circuitry to the second circuitry. In operation, the first circuitry 110 (an example of which is described below with reference to FIG. 3) generates the data packet including a data payload and, in at least some cases, metadata or attributes in a form to be described below, and transmits it via the interconnect 120 to the second circuitry 140. The second circuitry 140 (an example of which is described below with reference to FIG. 4) response to the data packet at least by storing the data payload. For example, this may be stored by the memory system 150 but other more detailed examples will be discussed below.

In this context, therefore, at least some examples of the data packets may include a write data packet containing, as a data payload, data to be written by the first circuitry to storage associated with the second circuitry. Further terminology applicable to these operations can include references to the first circuitry as a requester, a sender or the like, and references to the second circuitry as a recipient, a target or the like. It will be appreciated that the actual functionality described here is independent of the particular terminology used to describe the first and second circuitries.

Figure 2:
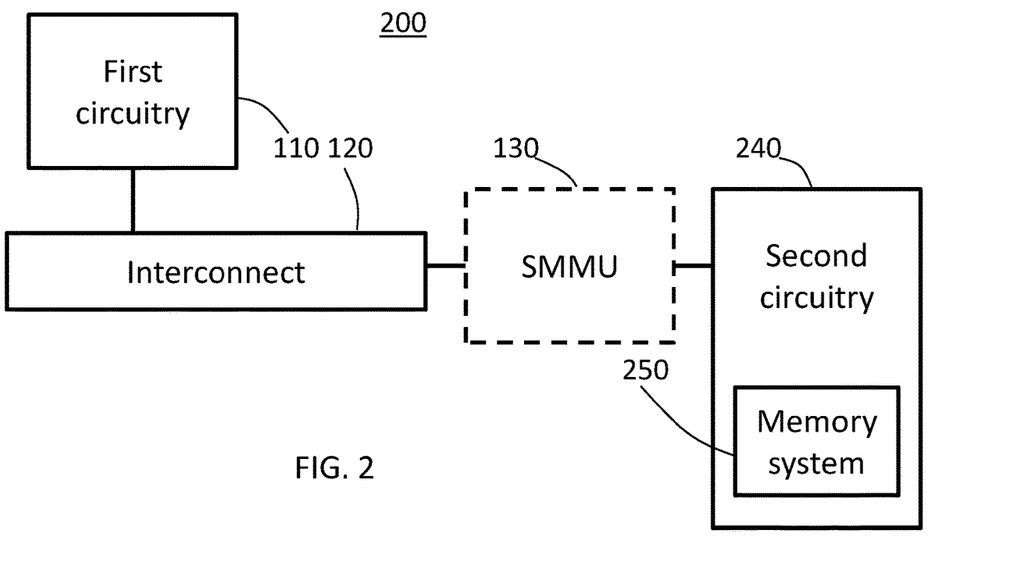
FIG. 2 schematically illustrates another example of a data processing apparatus.

In another example arrangement represented by apparatus 200 of FIG. 2, instead of (or in addition to) the memory system 150, a memory system 250 can form part of the second circuitry 240.

Note that more than one first circuitry and/or more than one second circuitry may be provided in embodiments of an actual apparatus. The routing data provided as part of the data packet can control routing to a particular second circuitry as a destination and can also provide information defining which first circuitry (as a source) issued that packet.

In some embodiments, a single integrated circuit substrate may provide at least the first circuitry, the second circuitry and the interconnect circuitry 120, for example as a so-called system-on-chip (SoC) or network-on-chip (NoC).

Example First Circuitry

Figure 3:
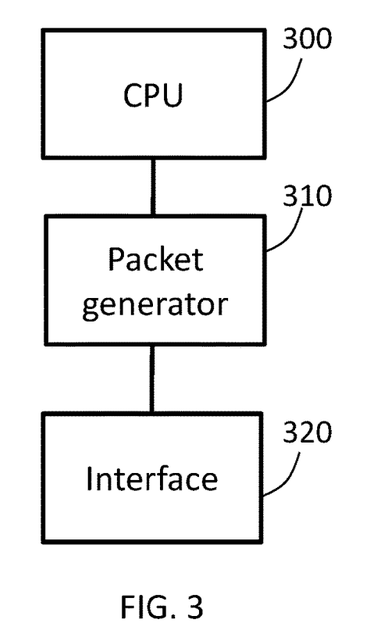
FIG. 3 schematically illustrates an example of first circuitry.

FIG. 3 provides a schematic example of at least some of the functionality of the first circuitry 110, which may comprise one or more processing elements or central processing units (shown schematically in FIG. 3 as a "CPU" 300) to execute program instructions which may include instructions to generate or initiate write operations involving transmitting a data payload to the second circuitry. Operations executed by the CPU 300 may also control the generation of the metadata or attributes to be discussed below.

Packet generator circuitry 310 forms the data payload, metadata or attributes and other appropriate data such as header and routing information into a data packet, for example at least substantially complying with the PCIe standards, at least subject to the discussion below about the provision of the metadata or attributes.

Note that the packet generator circuitry 310 may in fact be implemented as a software-control process executed by the CPU 300, or by separate dedicated circuitry.

An interface 320 provides interface functionality with the interconnect circuitry 120.

FIG. 3 therefore provides an example of generator circuitry 300, 310 to generate a data communication packet comprising at least payload data and a target address for storage, by recipient circuitry, of the payload data; control circuitry 300 to determine a storage classification for the payload data of a given data communication packet, the storage classification indicating a degree of persistence to be applied to that payload data by the recipient circuitry; and packet transmission circuitry 310, 320 to transmit the given data communication packet with the storage classification to the recipient circuitry.

The generator circuitry may be configured to represent the storage classification by a predetermined data field (Tag data, see below) of the data communication packet.

Example Second Circuitry

Figure 4:
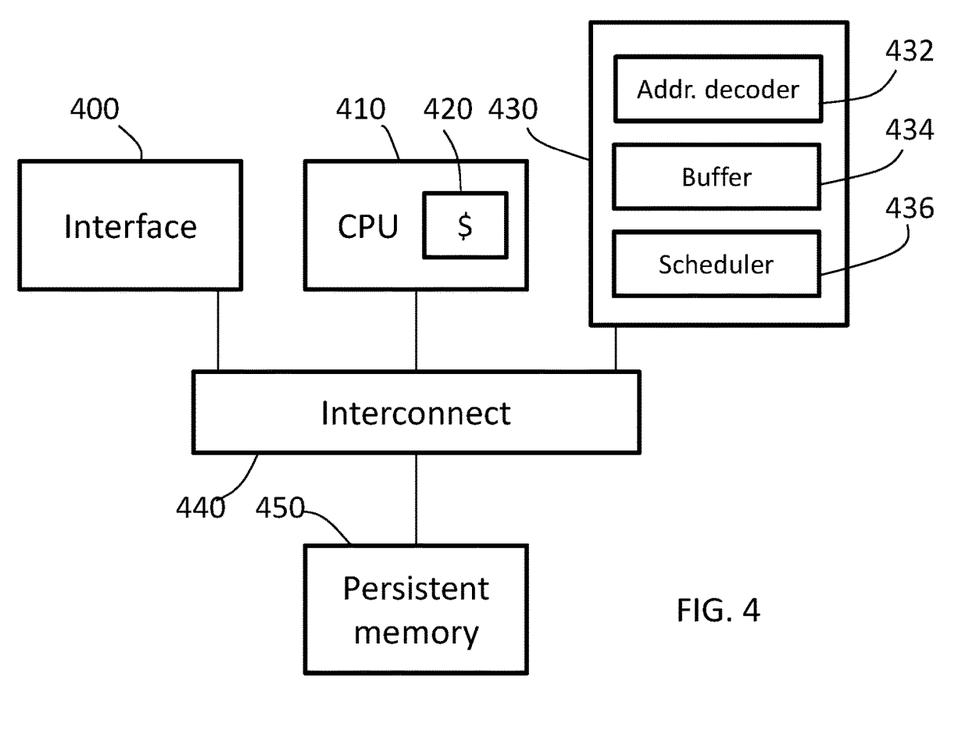
FIG. 4 schematically illustrates an example of second circuitry.

FIG. 4 provides a schematic example of a least some of the functionality of the second circuitry 140/240. Again, this may include interface circuitry 400 to interface with the interconnect circuitry 120 and a CPU 410, potentially having associated cache ("$") storage 420. Both of these are connected to interconnect circuitry 440 of the second circuitry, to which a storage controller 430 and so-called persistent memory 450 are also connected.

The storage controller 430 handles (at least) the fifth storage of payload data received within data packets provided to the second circuitry, for example from the first circuitry. The storage controller comprises an address decoder 432 to decode a storage location applicable to the payload data, a buffer 434 and a schedule 436 to schedule data write operations.

The writing of data can take place to one or both of the cache memory 420 and the persistent memory 450. Substantive differences between these two types of memory will now be discussed. The cache memory 420 is generally quicker in terms of access times for the CPU 410 and so can be applicable to data which is to be used by the CPU in the near future. Cache memories 420 typically have relatively small capacities (compared to the persistent memory 450) and are therefore applicable to the temporary storage of a limited subset of the data in use by the system. The cache memory 420 is typically non-persistent which in this context means that data stored by the cache memory 420 may be lost or deleted when there is a loss of power to the second circuitry (implying that the cache memory is "volatile").

Note that data stored by the cache memory 420 may also be deleted in a managed fashion when there is a requirement to create free space in the cache memory 420 to allow storage of a newly received data item and/or there is a change of thread, process or execution context by the CPU 410. Either of these situations is typically accompanied by the managed flushing of the cached contents of the cache memory 420 to the persistent memory 450.

In contrast to the volatile nature of the cache memory 420, the persistent memory 450 is non-volatile, which in this context implies that in the event of a loss of power, the data currently stored by the persistent memory 450 at that point in time is not lost and will still be accessible upon resumption of operation.

Previously proposed packet handling systems do not allow the first circuitry or requester to control or at least steer the type of storage used at the second circuitry or recipient to store write data received as the data payload of a data packet from the first circuitry. In such previously proposed arrangements it is up to the second circuitry to store the data payload in the cache memory 420 or the persistent memory 450. Note that these two memories may each be addressable by the address range specified by the incoming packet.

In transmitting a data packet from the first circuitry to the second circuitry, the data packet may have to travel through buffers, caches, interconnects or the like which are non-persistent. The first circuitry may have no knowledge of whether a data payload has reached a persistent storage domain within the overall apparatus.

Furthermore, example embodiments recognise that such an arrangement may lead to the second circuitry (for its own prevailing reasons) storing a data payload in a destination (the cache memory for 20 or the persistent memory 450) independently of any future requirements applicable to that data payload. However, the first circuitry may be aware of such future requirements. Example arrangements therefore provide the facility for the first circuitry to provide a data placement indication to the second circuitry as to whether the data payload of a given data packet should be stored in the cache memory 420, the persistent memory 450 or both at the recipient or second circuitry. Assuming that the second circuitry actually provides these types of storage, the second circuitry may be arranged to follow the indication provided by the first circuitry. The indication may be provided as metadata or one or more attributes within or associated with the given data packet.

The following three examples illustrate a potential need for requester control of the data placement within the target or recipient system.

(a) In cases where the data written has a chance of being requested by other agents in the system or by the requestor itself later on and is also ephemeral in nature (which in this context implies that it is of temporary relevance or usefulness, after which it may be discarded), it is better to keep it cached in a volatile but high speed cache (such as an SRAM cache) in the target. This is because reading from a cache will result in much higher performance than reading from the persistent memory and since the data is ephemeral, committing to persistent memory is unnecessary.

(b) In other cases, it might be better for durability to make sure that the write is made persistent as soon as it reaches the target while keeping a copy in the cache. Therefore, this represents a "dual storage" strategy in which the requester indicates to the recipient that a data payload should be stored in the persistent memory and the cache memory upon receipt. Doing caching helps performance and making the write persistent in parallel ensures that a later request from the requestor to make the data durable (to be discussed below, but basically comprising a request for the second circuitry to confirm that the data has been successfully written to the persistent memory) can be completed relatively quickly.

(c) The second circuitry might have multiple persistence domains and the requestor will have specific requirements about which domain the data needs to reside in. For example, a target can have two persistence domains: domain 1 will be battery backed and hence not necessarily long-term non-volatile, whereas the domain 2 is the actual non-volatile memory which will be long-term non-volatile. Domain 1 may have faster read and write times compared to domain 2. It is desirable for the requestor to choose the persistence domain to which the writes have to be placed, based on the applications performance and durability needs.

By way of example, one way by which to achieve the objective of the requestor being able to control the placement of the write data at the target, example embodiments propose the following. A write request packet such as a PCIe write packet will have an optional "data placement" attribute as part of the write request packet. This attribute's value is used to choose between the following indications:

(i) The target must place the data in persistence domain number "x" (the value of x depends on the target's persistence domains and what the requestor's usage model needs). As a decision taken locally at the target, the target can also keep a copy of the data in the non-persistent domain (i.e. in its volatile cache(s) or in volatile DRAM/SRAM memory if provided).

(ii) The target must place the data inside persistence domain number "x" (x being a platform dependent, requestor determined parameter) and not keep a cached copy.

(iii) The target can keep the data in a non-persistent domain until the requestor sends a request to push the data to one of the persistence domains. Typically, this means it is cached in a volatile cache.

In example embodiments the recipient or target will do the data placement based on the "Data Placement" attribute's value or indication. In all three cases, the target is expected to make the write globally observable as soon as possible.

For the example cases (i) and (ii), the target is expected to make the write durable (which is to say that the write reaches the persistence domain) as soon as possible.

For the example cases (i) and (iii), the requestor can additionally (optionally) specify the exact cache level to be used, for example as between a so-called level I, level II or level III cache (if more than one level is provided). This may be an additional attribute that will be part of the write request.

In other examples, the data placement indication provided by the first circuitry can be treated as a strong preference or guidance (a "hint") by the second circuitry, in that the second circuitry may be allowed to derogate from the data placement requested by the first circuitry.

In example arrangements the target exposes (for example, indicates) the number of persistence domains it has and the properties of each via software (running at the first circuitry) readable property tables, for example stored in the memory system 150, 250. This information can be used by the requestor in the determination of what data placement attribute to use.

Therefore, this provides an example in which the second circuitry is configured to provide configuration data indicating a number of persistent storage devices and//or a number of non-persistent storage devices to the sending circuitry. For example the second circuitry may comprise at least two persistent storage devices and/or at least two non-persistent storage devices. (At the sending side, the first circuitry is responsive to configuration data indicating a number of persistent storage devices and/or a number of non-persistent storage devices at the recipient circuitry. In examples, the control circuitry of the first circuitry is configured to select a classification between at least two persistent storage devices and/or at least two non-persistent storage devices at the recipient circuitry.)

The target may also expose the cache levels it has and the properties of each level, again for example via software readable property tables. This information may be used by the requestor to determine the cache level to specify.

Schematic examples of such property tables may include the following information:

identity of recipient device (for example, device address or other device identifier)

list of persistent and non-persistent storage domains available; in example embodiments, this list could be partitioned by requester device; in other words, it is not a requirement that the same availability is offered to each requester device in a system, but instead a given requester device could be offered a bespoke availability amongst the storage domains which are physically available at that recipient device;

list of cache levels available; in example embodiments, this list could be partitioned by requester device; in other words, it is not a requirement that the same availability is offered to each requester device in a system, but instead a given requester device could be offered a bespoke availability amongst the cache levels which are physically available at that recipient device;

In response to the indication or data placement attribute received with a data packet, the CPU 410 and/or the storage controller 430 at the second circuitry cooperate to control the placement of the data payload of a given packet in the appropriate storage type or domain. Further details of this process will be discussed below.

The arrangement of FIG. 4 therefore provides an example of packet reception circuitry (400, 410) to receive a data communication packet with a storage classification from sending circuitry, the data communication packet including at least payload data and a target address for storage of the payload data; and storage control circuitry (410, 430) to control writing of the payload data of a given data communication packet by one or more storage devices selected from a set of two or more candidate storage devices (420, 450) each addressable by the target address, the storage control circuitry being responsive to the storage classification received with the given data communication packet and to respective persistence properties associated with the set of two or more candidate storage devices. The candidate storage devices in this example comprise at least one persistent storage device 450, a persistent storage device being a non-volatile storage device to store data in response to a data handling process such that the data can be accessed after termination of the data handling process; and at least one non-persistent storage device such as the cache memory 420. More than one of either or both of these may be provided.

The packet reception circuitry (400, 410) is configured to detect the storage classification as a predetermined data field (Tag data, see below) of the data communication packet.

Interchangeability of First and Second Circuitry Functionality

Note that in a typical embodiment (and in the examples of FIGS. 1 and 2) a given circuitry may have both functionalities and selectively act as a first circuitry or a second circuitry, and indeed from packet to packet, the nature of a given circuitry as a sender or receiver may interchange. Therefore, any individual circuitry may have features of FIG. 3 and FIG. 4, albeit that the CPU(s) 300, 410 (represented separately in the two drawings) may be the same CPU(s).

Examples with Root Ports

Figure 5:
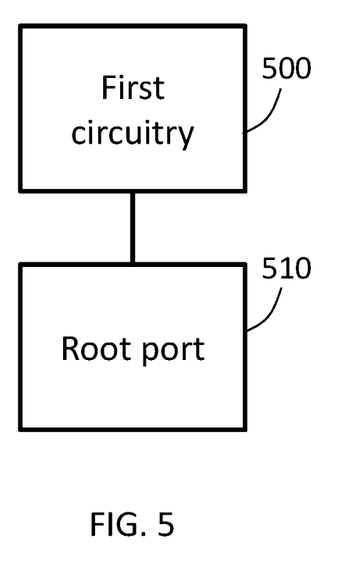
FIGS. 5 and 6 schematically illustrate the use of so-called root ports.
Figure 6:
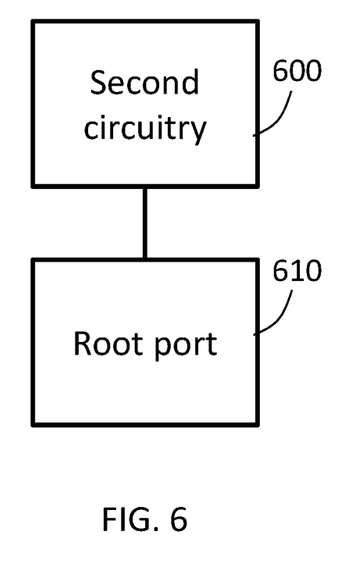

In some example arrangements such as example PCIe arrangements, and referring to FIGS. 5 and 6, one or both of the first 500 and second 600 circuitry may be connected to the rest of the system or apparatus of Figure one or FIG. 2 via a so-called root port 510, 610. In some examples, a root port acts as a hub to provide connection for multiple circuitries.

Example Write Packet

Figure 7:
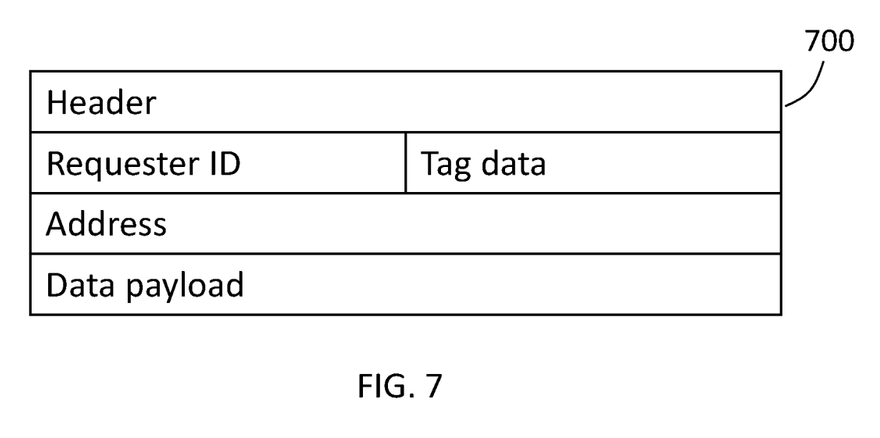
FIGS. 7 and 8 schematically illustrate respective data packets.

FIG. 7 schematically illustrates an example write packet comprising various fields 700 including (by way of example):
- header information providing packet routing such as an identifier of the target (second circuitry) and optionally other housekeeping data;
- a Requester ID (identifier) indicating the first circuitry which issued the packet;
- Tag data providing, for example, the data placement attribute(s) discussed above;
- an Address field indicating a physical or virtual address for storage of the data payload by the recipient or target circuitry; and
- the data payload itself.

The tag data can be encoded by any suitable encoding, for example an n-bit code, each possible value indicating a respective one of the outcomes (i)-(iii) above, or each possible value indicating a permutation of the storage and/or caching options exposed by that recipient using the techniques discussed above, for example by reference to the order by which the options are exposed in the tables discussed above.

In some examples, the second circuitry may send an acknowledgement (routed to the Requester ID) in response to receipt of the write packet and/or in response to implementation of the write specified by the write packet. In other examples, in particular example PCIe implementations, an acknowledgement is not sent at this stage.

Example Flush to Persistent Packet

Figure 8:
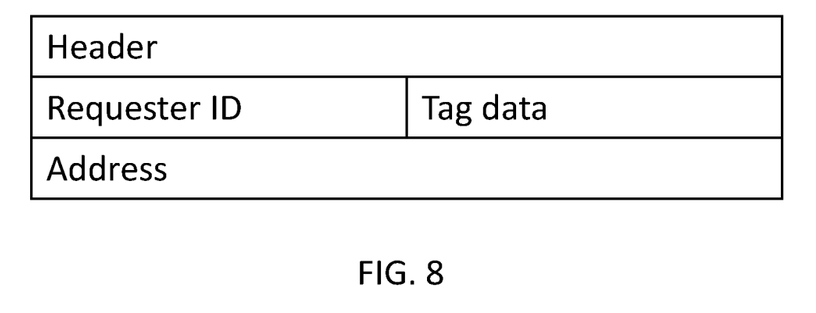

Another type of packet relevant to the discussion below is a flush to persistent packet. The purpose and use of such packets will be discussed below, but an example of the overall structure of such a packet is shown schematically in FIG. 8, again comprising a number of fields such as:
- header information providing packet routing such as an identifier of the target (second circuitry) and optionally other housekeeping data;
- a Requester ID (identifier) indicating the first circuitry which issued the packet;
- optionally Tag data indicating (for example) a particular persistent domain to which the data concerned should be flushed (if not included or not specified then the target may select a domain or may use the available domain if the target has only one such domain); and
- an Address field indicating a physical or virtual address to be flushed to persistent memory. Alternatively, an indication of "all memory addresses" may be specified.

Example Process at First Circuitry

Figure 9:
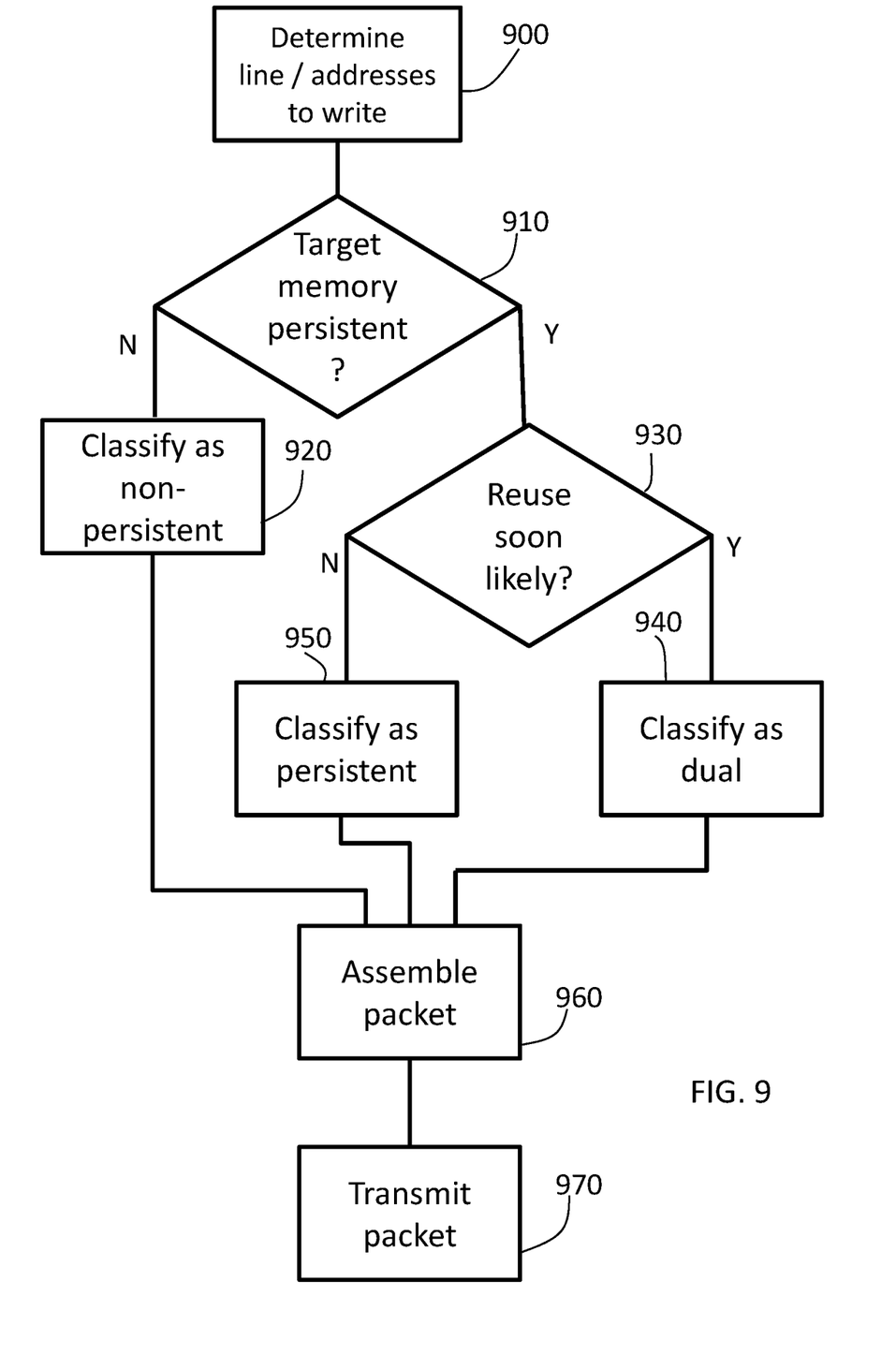
FIGS. 9 to 14 are schematic flowcharts illustrating respective methods.

FIG. 9 is a schematic flowchart illustrating an example of a method performed at the first circuitry relating to the assembly and transmission of a data packet according to the techniques discussed above. The steps of FIG. 9 may be performed by the arrangement of FIG. 3, and in particular by the CPU 300 and/or the packet generator 310.

At a step 900, the CPU 300 determines a line or more generally a range of memory addresses to write.

At a step 910, a determination is made as to whether the required target (second circuitry) has persistent memory available. This determination can be made by consulting the software-readable tables discussed above, by consulting data obtained by performing a query to the second circuitry at system boot, or the like. If the outcome is negative then control passes to a step 920 in which the data write is classified as non-persistent. At a step 960, a packet of the type shown in FIG. 7 is assembled including the payload data and tag data indicating a data placement attribute representing "non-persistent" and at a step 970 the packet is transmitted via the interface 320.

Returning to the positive outcome of the step 910, control passes to a step 930 at which the CPU 300 makes a determination as to whether it is likely that the data payload will be reused soon.

Here, the expressions "likely" and "soon" may be defined analytically; for example, a determination of "likely and soon" reuse could depend upon any one or more of: (a) is that line or range of addresses cached at the first circuitry? (b) is that line or range of addresses being referred to within a loop operation?

Alternatively, the determination of "likely and soon" reuse could be defined relatively, so that at any time the CPU 300 determines whether reuse soon is more or less likely than the determination applicable to addresses already classified as being subject to "likely and soon" reuse.

Whatever metric is used to generate the determination at the step 930, if the outcome is positive then control passes to a step 940 at which the write operation is classified as "dual" storage (store to persistent and non-persistent). If a range of domains and cache levels is available, then a selection may optionally be determined at the step 940. The determination(s) made at the step 940 are encoded into the tag data. Control continues with the step 960 and 970 discussed above.

On the other hand, if there is a negative outcome from the step 930 then control passes to a step 950 at which the write operation is classified as "persistent" (store only to persistent memory). Again if a range of persistent domains is available, then a selection may optionally be determined at the step 950. The determination(s) made at the step 950 are encoded into the tag data. Again, control continues with the step 960 and 970 discussed above.

The outcome of the flowchart of FIG. 9 is the transmission of a data packet including the various fields discussed in connection with FIG. 7.

This therefore provides an example of the following outcomes, in which the control circuitry is configured:
- to determine 920 the storage classification to be a non-persistent classification, indicating a request to the recipient circuitry to write the payload data to at least one non-persistent storage device;

to determine 950 the storage classification to be a persistent classification, indicating a request to the recipient circuitry to write the payload data to at least one persistent storage device; and to determine 940 the storage classification to be a dual classification, indicating a request to the recipient circuitry to write the payload data to at least one non-persistent storage device and to at least one persistent storage device.

In the examples, a data processor 300 may be configured, in response to execution of processing instructions by the data processor, to provide the payload data to the generator circuitry and to provide an indication of a required storage classification to the control circuitry.

Example Process at Second Circuitry

Figure 10:
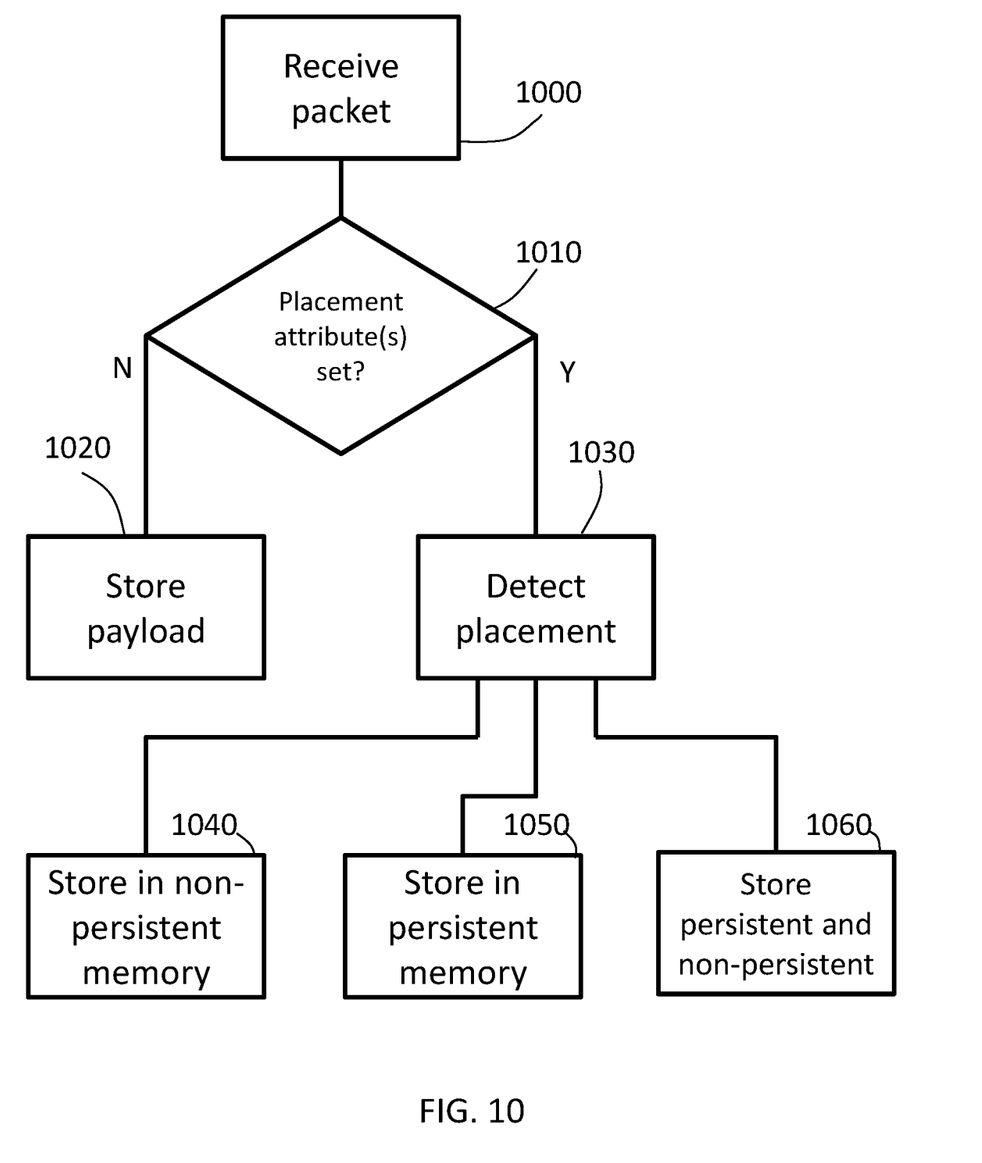

FIG. 10 schematically illustrates example processes carried out at the second circuitry in response to reception of a packet (at a step 1000) of the type described above. The process of FIG. 10 may be performed by the CPU 410 and/or the storage controller 430 of FIG. 4, for example.

At the step 1000, a write packet is received by the interface 400. At a step 1010, the CPU 410 and/or the storage controller 430 detect whether the packet contains tag data indicating one or more data placement attributes. If the outcome is negative then control passes to a step 1020 at which the payload data is stored, at the address specified by the packet, in a placement (for example, persistent or non-persistent) selected by the second circuitry.

If the outcome of the step 1010 is positive then control passes to a step 1030 at which the placement defined by the tag data is detected and, depending on the detected placement, control is passed to one of the steps 1040, 1050, 1060. The step 1040 relates to storage only in non-persistent memory such as one or more cache memories 420. The step 1050 relates to storage only in persistent memory such as the persistent memory 450 (which may in turn be implemented by the memory system of FIG. 1 or FIG. 2). The step 1060 relates to dual storage in persistent and non-persistent storage. In each case, if the tag data specifies a particular domain, cache level or the like then the relevant step follows that specification.

In summary, FIG. 10 shows the following example outcomes:

when the storage classification indicates a non-persistent classification and when the set of two or more candidate storage devices comprises at least one non-persistent storage device, writing (1040) the payload data to the at least one non-persistent storage device; and when the storage classification indicates a persistent classification and when the set of two or more candidate storage devices comprises at least one persistent storage device, writing (1050) the payload data to the at least one persistent storage device.

when the storage classification indicates a dual classification and when the set of two or more candidate storage devices comprises at least one non-persistent storage device and at least one persistent storage device, writing (1060) the payload data to the at least one non-persistent storage device and to the at least one persistent storage device.

Use of Flush to Persistent Packets

In an example situation, such as a situation involving an update to a database, it can be important that the requester (first circuitry) knows which data has been successfully stored in persistent memory, in order to provide for potential rollback operations. The use of a flushed persistent packet provides such a guarantee.

Examples will now be described relating to the use of so-called flush to persistent packets of the type described above with reference to FIG. 8. In particular, FIG. 11 is a schematic flowchart representing steps performed at the first circuitry and FIG. 12 is a schematic flowchart representing steps performed at the second circuitry, each in connection with such a packet.

Figure 11:
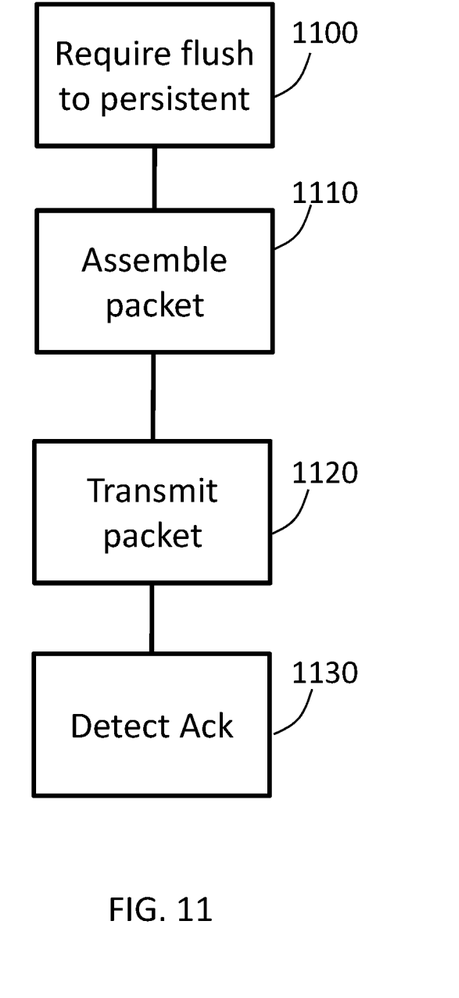

Referring to FIG. 11, the CPU 300 detects all determines and needs to flush data to persistent memory at a step 1100. The CPU 300 and the packet generator 310 operate to assemble (at a step 1110) and transmit (at a step 1120) a flush to persistent packet defining at least the address range to be flushed. Finally, given that this type packet is acknowledged in the present examples, at a step 1130 the first circuitry awaits and detects an acknowledgement from the relevant second circuitry.

This therefore provides an example in which the control circuitry of the first circuitry is configured to generate 1110 a flush command to the sending circuitry in respect of the target address, to request the recipient circuitry to write data at the target address from at least one non-persistent storage device to at least one persistent storage device.

Figure 12:
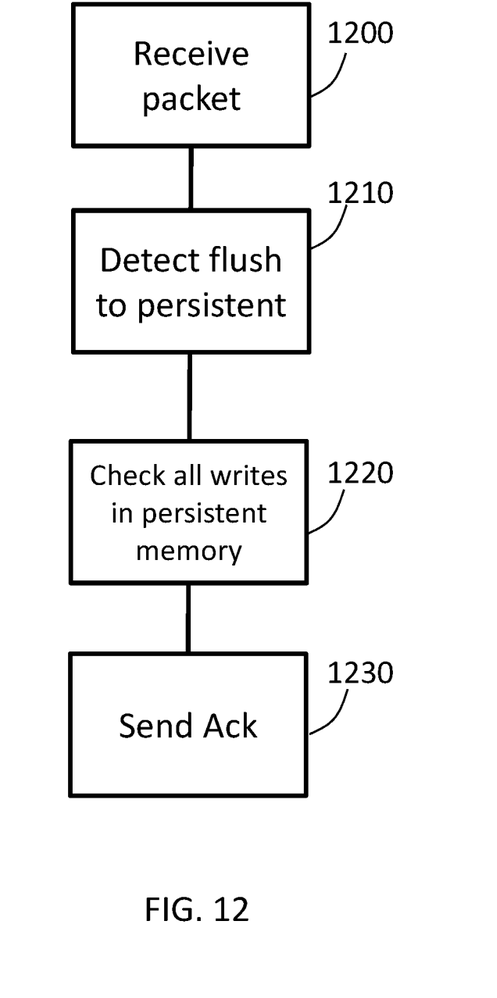

Referring to FIG. 12, the second circuitry receives such a packet at a step 1200 and, at a step 1210 detects that it is a flush to persistent packet defining an address range. The step 1210 also refers to the potential initiation by the second circuitry of the flushing of the relevant data to persistent memory, which may (or may not) include deleting the data from non-persistent memory. A step 1220 involves checking that all of the relevant data is now in persistent memory and in response to that check being made, the second circuitry sends an acknowledgement at a step 1230.

This therefore provides an example in which the storage control circuitry 410, 430 is configured, in response to a flush command received from the sending circuitry in respect of the target address, to execute the flush command by writing (1210) data at the target address from the at least one non-persistent storage device to the at least one persistent storage device, and the circuitry is configured to send (1230) an acknowledgement to the sending circuitry in response to execution of the flush command.

Summary Apparatus

The arrangements discussed above provide examples of data processing apparatus 100, 200 comprising:

first data processing circuitry 110;

second data processing circuitry 140, 240;

interconnect circuitry 120 to provide a data connection at least for the transmission of data communication packets between the first data processing circuitry and the second data processing circuitry; and data storage circuitry 150, 250, 420, 450 comprising a set of two or more candidate storage devices associated with one or both of the first data processing circuitry and the second data processing circuitry, each of the set of two or more candidate storage devices being addressable by a target address;

in which at least one of the first data processing circuitry and the second data processing circuitry is configured to operate as sending circuitry comprising generator circuitry 300, 310 to generate a data communication packet comprising at least payload data and the target address for storage, by another of the first data processing circuitry and the second data processing circuitry acting as recipient circuitry, of the payload data; control circuitry 300, 310 to determine a storage classification for the payload data of a given data communication packet, the storage classification indicating a degree of persistence to be applied to that payload data by the recipient circuitry; and packet transmission circuitry 310, 320 to transmit the given data communication packet with the storage classification to the recipient circuitry;

and in which at least one of the first data processing circuitry and the second data processing circuitry is configured to operate as recipient circuitry comprising packet reception circuitry 400, 410 to receive the data communication packet with the storage classification from another of the first data processing circuitry and the second data processing circuitry acting as sending circuitry; and storage control circuitry 410, 430 to control writing of the payload data of a given data communication packet by one or more storage devices selected from the set of two or more candidate storage devices, the storage control circuitry being responsive to the storage classification received with the given data communication packet and to respective persistence properties associated with the set of two or more candidate storage devices.

Summary Methods

Figure 13:
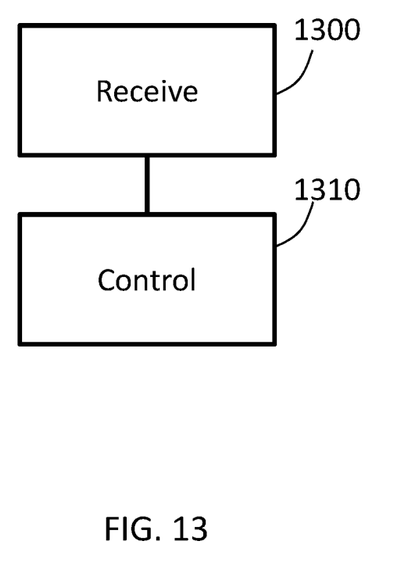

FIG. 13 is a schematic flowchart illustrating a method comprising:

receiving (at a step 1300), at recipient circuitry, a data communication packet with a storage classification from sending circuitry, the data communication packet including at least payload data and a target address for storage of the payload data; and controlling (at a step 1310) writing of the payload data of a given data communication packet by one or more storage devices selected from a set of two or more candidate storage devices each addressable by the target address, the storage control circuitry being responsive to the storage classification received with the given data communication packet and to respective persistence properties associated with the set of two or more candidate storage devices.

Figure 14:
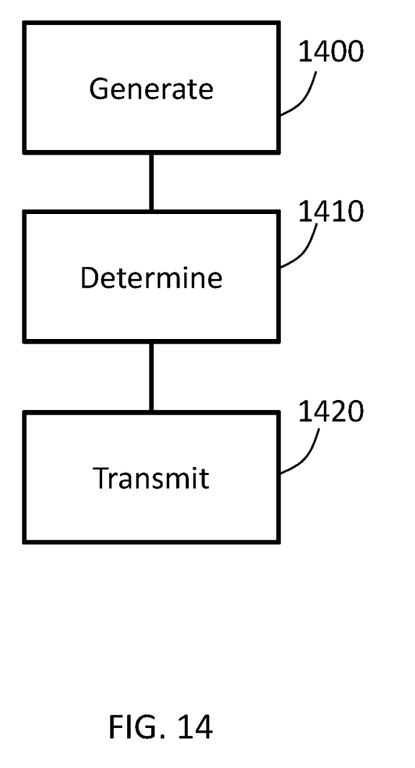

FIG. 14 is a schematic flowchart illustrating a method comprising:

generating (at a step 1400), at sending circuitry, a data communication packet comprising at least payload data and a target address for storage, by recipient circuitry, of the payload data;

determining (at a step 1410) a storage classification for the payload data of a given data communication packet, the storage classification indicating a degree of persistence to be applied to that payload data by the recipient circuitry; and transmitting (at a step 1420) the given data communication packet with the storage classification to recipient circuitry.

The methods defined above may be performed by any of the circuitry or apparatus embodiments discussed above, which may for example be configured to execute the various method steps. In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:
 configuration provision circuitry to provide configuration data to sending circuitry, the configuration data identifying a set of two or more candidate storage devices available for the sending circuitry and corresponding persistence characteristics of the two or more candidate storage devices;
 packet reception circuitry configured to receive a data communication packet from the sending circuitry, the data communication packet including at least payload data and a target address for storage of the payload data, the target address belonging to a particular address space;
 wherein the data communication packet includes a predetermined data field specifying a data placement attribute and the packet reception circuitry is configured to detect a storage classification in the received data communication packet based on the predetermined data field specifying the data placement attribute, the storage classification indicative of one or more storage devices selected from the set of two or more candidate storage devices identified in the configuration data; and
 storage control circuitry to control writing of the payload data of the data communication packet by the one or more storage devices selected from the set of two or more candidate storage devices sharing the particular address space such that each of the two or more candidate storage devices are addressable by the target address, the storage control circuitry being responsive to the storage classification detected by the packet reception circuitry and to respective persistence properties associated with the set of two or more candidate storage devices.

2. The data processing circuitry of claim 1, in which the set of two or more candidate storage devices comprises:
 at least one persistent storage device, a persistent storage device being a non-volatile storage device to store data in response to a data handling process such that the data can be accessed after termination of the data handling process; and
 at least one non-persistent storage device.

3. The data processing circuitry of claim 2, in which the at least one non-persistent storage device comprises a cache memory.

4. The data processing circuitry of claim 2, the configuration data indicating a number of persistent storage devices and//or a number of non-persistent storage devices to the sending circuitry.

5. The data processing circuitry of claim 2, comprising at least two persistent storage devices and/or at least two non-persistent storage devices.

6. The data processing circuitry of claim 2, in which the storage control circuitry is configured, in response to a flush command received from the sending circuitry in respect of the target address, to execute the flush command by writing data at the target address from the at least one non-persistent storage device to the at least one persistent storage device.

7. The data processing circuitry of claim 6, in which the circuitry is configured to send an acknowledgement to the sending circuitry in response to execution of the flush command.

8. The data processing circuitry of claim 1, in which the storage control circuitry is configured:
when the storage classification indicates a non-persistent classification and when the set of two or more candidate storage devices comprises at least one non-persistent storage device, to write the payload data to the at least one non-persistent storage device; and
when the storage classification indicates a persistent classification and when the set of two or more candidate storage devices comprises at least one persistent storage device, to write the payload data to the at least one persistent storage device.

9. The data processing circuitry of claim 8, in which the storage control circuitry is configured, when the storage classification indicates a dual classification and when the set of two or more candidate storage devices comprises at least one non-persistent storage device and at least one persistent storage device, to write the payload data to the at least one non-persistent storage device and to the at least one persistent storage device.

10. Data processing circuitry comprising:
configuration reception circuitry to receive configuration data from recipient circuitry, the configuration data identifying a set of two or more candidate storage devices and corresponding persistence characteristics of the two or more candidate storage devices;
generator circuitry configured to generate a data communication packet comprising at least payload data and a target address for storage, by the recipient circuitry configured to operate as recipient circuitry, of the payload data, wherein the target address belongs to a particular address space;
control circuitry configured to determine, based on an indication of a required storage classification at the recipient circuitry, a storage classification for the payload data of the data communication packet, the determined storage classification indicating a degree of persistence to be applied to that payload data by the recipient circuitry and indicative of one or more storage devices selected from the set of two or more candidate storage devices identifier in the configuration data; and
packet transmission circuitry configured to transmit the data communication packet with a predetermined data field specifying a data placement attribute corresponding to the determined storage classification to the recipient circuitry.

11. The data processing circuitry of claim 10, in which the control circuitry is configured:
to determine the storage classification to be a non-persistent classification, indicating a request to the recipient circuitry to write the payload data to at least one non-persistent storage device; or
to determine the storage classification to be a persistent classification, indicating a request to the recipient circuitry to write the payload data to at least one persistent storage device.

12. The data processing circuitry of claim 11, in which the control circuitry is configured to generate a flush command to the data processing circuitry in respect of the target address, to request the recipient circuitry to write data at the target address from at least one non-persistent storage device to at least one persistent storage device.

13. The data processing circuitry of claim 10, in which the storage control circuitry is configured to determine the storage classification to be a dual classification, indicating a request to the recipient circuitry to write the payload data to at least one non-persistent storage device and to at least one persistent storage device.

14. The data processing circuitry of claim 10, comprising data processing circuitry configured, in response to execution of processing instructions by the data processing circuitry, to provide the payload data to the generator circuitry and to provide the indication of the required storage classification to the control circuitry.

15. The data processing circuitry of claim 10, the circuitry being responsive to the configuration data indicating a number of persistent storage devices and/or a number of non-persistent storage devices at the recipient circuitry.

16. The data processing circuitry of claim 10, in which the control circuitry is configured to select a classification between at least two persistent storage devices and/or at least two non-persistent storage devices at the recipient circuitry.

17. A data processing apparatus comprising:
first data processing circuitry;
second data processing circuitry;
interconnect circuitry to provide a data connection at least for the transmission of data communication packets between the first data processing circuitry and the second data processing circuitry; and
data storage circuitry comprising a set of two or more candidate storage devices associated with one or both of the first data processing circuitry and the second data processing circuitry, each of the set of two or more candidate storage devices being addressable by a target address belonging to a particular address space;
in which at least one of the first data processing circuitry and the second data processing circuitry is configured to operate as sending circuitry comprising configuration reception circuitry to receive configuration data from recipient circuitry, the configuration data identifying a set of two or more candidate storage devices and corresponding persistence characteristics of the two or more candidate storage devices; generator circuitry configured to generate a data communication packet comprising at least payload data and the target address for storage, by another of the first data processing circuitry and the second data processing circuitry acting as recipient circuitry, of the payload data; control circuitry configured to determine, based on an indication of a required storage classification at the recipient circuitry, a storage classification for the payload data of the data communication packet, the determined storage classification indicating a degree of persistence to be applied to that payload data by the recipient circuitry; and packet transmission circuitry configured to transmit the data communication packet with a predetermined data field specifying a data placement attribute corresponding to the determined storage classification to the recipient circuitry;
and in which at least one of the first data processing circuitry and the second data processing circuitry is configured to operate as recipient circuitry comprising configuration provision circuitry to provide the configuration data to another of the first data processing circuitry and the second data processing circuitry acting as sending circuitry; packet reception circuitry configured to receive the data communication packet with from the sending circuitry, the packet reception circuitry configured to detect the storage classification in the received data communication packet based on the predetermined data field specifying the data placement attribute; and storage control circuitry configured to control writing of the payload data of the data communication packet by one or more storage devices selected from the set of two or more candidate storage devices sharing the particular address space such that each of the two or more candidate storage devices are addressable by the target address, the storage control circuitry being responsive to the storage classification detected by the packet reception circuitry and to respective persistence properties associated with the set of two or more candidate storage devices.

18. The data processing apparatus of claim 17, comprising a single integrated circuit substrate by which at least the first data processing circuitry and the second data processing circuitry are implemented.

* * * * *